Sept. 11, 1923.
F. P. WOOD
1,467,969
MOISTUREPROOF FIBER CONTAINER
Filed April 18, 1919
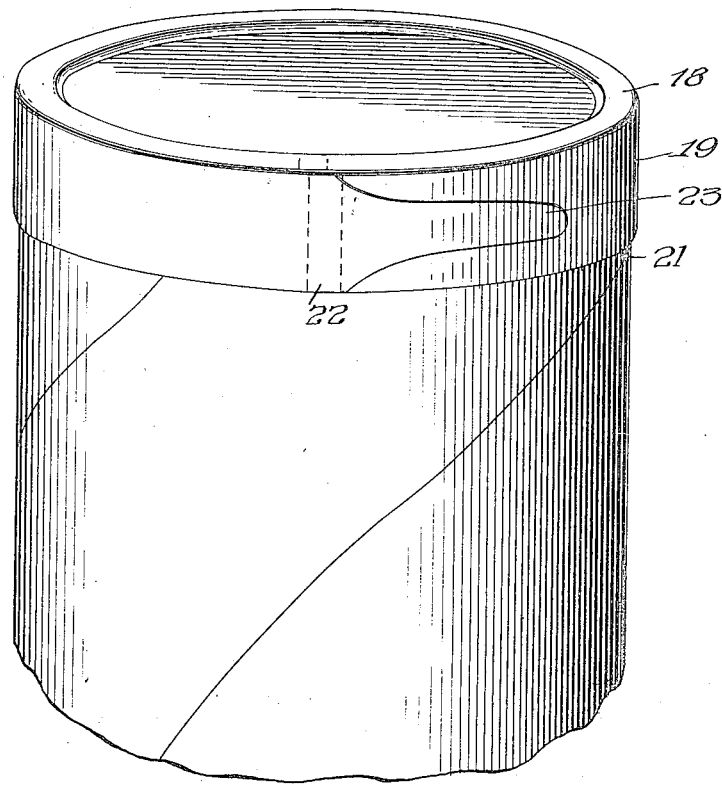
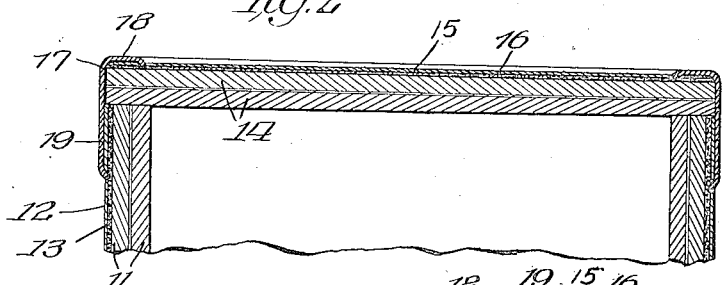
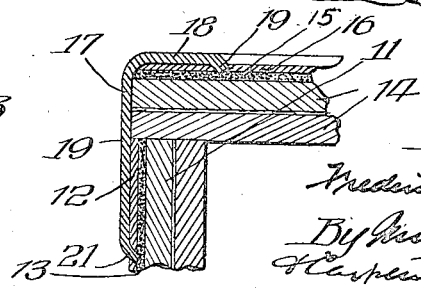
Inventor
Frederick P. Wood
By Munday Clarke
& Carpenter, Attys Patented Sept. 11, 1923.

1,467,969

UNITED STATES PATENT OFFICE.

FREDERICK P. WOOD, OF NEW YORK, N. Y., ASSIGNOR TO AMERICAN CAN COMPANY, OF NEW YORK, N. Y., A CORPORATION OF NEW JERSEY.

MOISTUREPROOF FIBER CONTAINER.

Application filed April 18, 1919. Serial No. 290,929.

*To all whom it may concern:*

Be it known that I, FREDERICK P. WOOD, a citizen of the United States, residing in New York, in the county of New York and State of New York, have invented a new and useful Improvement in Moistureproof Fiber Containers, of which the following is a specification.

This invention relates in general to moisture proof fiber containers and has for its object broadly the provision of such a container which while being absolutely moisture proof may be readily opened to permit access into the interior.

The invention has for a further and important object the provision having these and other advantages which may be cheaply manufactured and which will be strong and durable in use.

Numerous other objects and advantages of the invention will be apparent as it is better understood from the following description when considered in connection with the accompanying drawing illustrating a preferred embodiment thereof.

Referring to the drawings,

Fig. 1 is a perspective view of a container embodying my present invention.

Fig. 2 is a partial vertical section through the top thereof, and

Fig. 3 is an enlarged similar section showing certain details of construction.

For the purposes of illustration I have shown upon the drawing a can or container body of cylindrical form and composed of two or more layers of fibrous material, and also a layer of fused cement, asphalt being preferably employed.

The inner layer in the present instance consists of a carcass built up of two or more plies 11 of fiber board or paper connected by any suitable cement glue being sufficient. The outer layer 12 is also of paper or fiber board and is connected with the carcass by an interposed layer 13 of the fused cement. This layer 13 of asphalt or the like extends completely throughout the length of the fiber body. A cover or disk similarly constructed of a carcass of two plies of fiber board 14, glued or otherwise secured together and an outer layer 15 of paper connected to the carcass by a layer 16 of cement, is provided and is of dimension in the present instance to rest upon an end of the body. A metal binding strip generally indicated at 17 is provided to hold this cover in place and this strip consists of an annular flange 18 and a cylindrical flange 19 connected at the extreme edge of the container. The two free marginal edges of the flanges 19 and 21 are forced in through the outer layers 15 and 12 of the cover and body respectively and into or into contact with the layers of fused cement 13 and 16 so that this strip with these layers of cement forms a continuous envelope for the contents within the container.

In order that the can or box may be readily opened the band is made so that it may be torn away; that is to say, it is made of a strip of the material suitably formed and overlapping at 22, the overlapping parts being soldered together and the outer end being provided with a tear off tongue 23 which upon pulling back breaks the solder connection and permits the removal of the strip and then of course the disk or cover.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A moisture proof container comprising a body and cover each composed of two or more layers of fibrous material connected by a fused cement, and a moisture proof member extending about the edges of said body and cover and entering into contact with the said layers of fused cement to provide a continuous layer of moisture proof material encompassing the space within the container.

2. A moisture proof container comprising a body and cover each composed of two or more layers of fibrous material connected by a fused cement, and a metal band disposed in contact with the fused cement layers of said body and cover connecting the same about the container.

3. A moisture proof container comprising a body and cover each composed of two layers of fibrous material connected together by a layer of fused cement and a metal band extending through the outermost layers of fibrous material and into the layers of fused cement of said body and cover.

4. A moisture proof container comprising a body and cover each composed of two or more layers of fibrous material connected by a layer of fused cement and a metal tear off band connecting said layers of fused cement.

5. A moisture proof container comprising a body and cover each composed of two or more layers of fibrous material connected by a layer of fused cement and a metal tear off band, said band comprising a strip of metal soldered at adjacent edges and having a tongue adapted on pulling to break the solder connection to permit removal of the cover.

6. A moisture proof container comprising two elements which are contiguous with each other at a joint, each of said elements consisting of an inner and an outer layer of pervious material united by an intermediate layer which is impervious as described; and an impervious uniting element which extends over said joint and at each side thereof is in tight contact with said intermediate and impervious layers of the said container elements respectively, whereby the passage of moisture through said joint is prevented.

7. A moisture proof container comprising a body, and a cover removably united with said body at a joint which permits the removal of the cover from the body, said cover and body each having an inner and an outer layer of pervious material united by an intermediate layer which is impervious as described; and an impervious uniting element which extends over said joint and at each side of the joint is in tight contact with said intermediate and impervious layers of the body and cover respectively, and which secures together said body and cover.

8. A moisture proof container comprising a body, and a cover removably united with said body at a joint which permits the removal of the cover from the body, said cover and body each having an inner and an outer layer of pervious material united by an intermediate layer which is impervious as described, the two impervious layers being discontinuous with each other; and an impervious uniting element which extends over said joint and at each side of the joint is in tight contact with said intermediate and impervious layers of the body and cover respectively, and which secures together said body and cover.

9. A moisture proof container comprising a paper body and a paper cover removably united with said body at a joint which permits the removal of the cover from the body, said cover and body each having an inner and an outer layer of paper united by an intermediate layer of fusible cement which is impervious as described; and an impervious uniting sheet metal element which extends over said joint and at each side of the joint is formed with inwardly bent edge flanges which pass through the outer paper layers of the body and cover and are in tight contact with said intermediate and impervious layers of the body and cover respectively, and which removably secures together said body and cover, said uniting element having its ends removably secured together.

10. A container having a plurality of separate impermeable asphalt sheets entirely enclosing the packing space of the container excepting at the places between said sheets, and pieces of sheet metal directly contacting with and uniting said asphalt sheets and covering all of said places between said sheets.

Signed in the presence of two subscribing witnesses.

FREDERICK P. WOOD.

Witnesses:
D. F. MENNIS,
J. DREYFUSS.